United States Patent
Najmolhoda et al.

[11] Patent Number: 6,164,322
[45] Date of Patent: *Dec. 26, 2000

[54] PRESSURE RELIEF LATCHING SOLENOID VALVE

[75] Inventors: Hamid Najmolhoda, Grand Rapids; David L. Seid, Coopersville; Ralph E. Verburg, Jenison, all of Mich.

[73] Assignee: Saturn Electronic & Engineering, Inc., Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/346,779

[22] Filed: Jul. 7, 1999

Related U.S. Application Data

[63] Continuation-in-part of application No. 09/232,761, Jan. 15, 1999.

[51] Int. Cl.[7] ................................................. F16K 15/00
[52] U.S. Cl. .................... 137/540; 137/625.48; 137/539; 251/65; 335/234
[58] Field of Search ................................ 137/540, 543.19, 137/539, 625.48; 335/239, 231, 234; 251/77, 65, 129.1, 129.16, 129.14; 123/90.1, 90.11

[56] References Cited

U.S. PATENT DOCUMENTS

| | | | |
|---|---|---|---|
| 3,420,492 | 1/1969 | Ray | 251/65 |
| 3,448,960 | 6/1969 | Medley | 251/129 |
| 3,743,898 | 7/1973 | Sturman | 335/230 |
| 3,889,219 | 6/1975 | Larner | 335/234 |
| 3,989,063 | 11/1976 | Brouwers et al. | 251/129 |
| 4,097,833 | 6/1978 | Myers | 335/261 |
| 4,165,762 | 8/1979 | Acar | 137/625.5 |
| 4,455,543 | 6/1984 | Pischinger et al. | 251/129 |
| 4,533,890 | 8/1985 | Patel | 335/234 |
| 4,749,167 | 6/1988 | Gottschall | 251/65 |
| 4,778,227 | 10/1988 | Bayliss | 251/129.16 |
| 4,779,582 | 10/1988 | Lequesne | 123/90.11 |
| 4,829,947 | 5/1989 | Lequesne | 351/129.16 |
| 4,938,545 | 7/1990 | Shuey et al. | 137/596.17 |

*Primary Examiner*—Gregory L. Huson
*Assistant Examiner*—Joanne Y. Kim

[57] ABSTRACT

A pressure relief latching solenoid valve includes one or more axially magnetized permanent magnets disposed proximate a pole piece with the axial magnetization direction of the magnet aligned in a manner to maintain the armature in either the first or second position after the electrical current pulse to the solenoid is terminated so as to provide bistable first and second armature positions that can be maintained without solenoid energization and that can be changed from one position to the other by an electrical current pulse to the solenoid. The armature can control movement of a ball valve of a fluid circuit such that the first and second armature positions correspond to closed and open positions of the ball valve. The closed position provides a maximum fluid pressure in the circuit and the open position provides a preset lower fluid pressure. A spring resides in a passage in the armature and has a preselected spring rate and spring preload. The spring rate and spring load as well as valve seat surface area to maintain the set fluid pressure and accommodate or relieve fluid pressure spikes in the fluid circuit to maintain the preset lower fluid pressure therein when the fluid control valve is open relative to the fluid circuit.

9 Claims, 5 Drawing Sheets

PRESSURE RELIEF LATCHING SOLENOID VALVE

This application is a continuation-in-part of Ser. No. 09/232,761 filed Jan. 15, 1999.

FIELD OF THE INVENTION

The present invention relates to a pressure relief latching solenoid valve for controlling fluid pressure in a fluid circuit.

BACKGROUND OF THE INVENTION

Bistable latching valves are known in the art. For example, U.S. Pat. No. 3,420,492 discloses a bistable latching valve that includes a complex arrangement of two permanent bar magnets which must contact each of two pole pieces of an associated electromagnetic coil. U.S. Pat. No. 4,165,762 discloses a bistable latching valve that requires two solenoids and a so-called snap disc to provide valve on/off positions. U.S. Pat. No. 3,448,960 discloses a latching solenoid valve for controlling flow of corrosive fluid.

U.S. Pat. Nos. 4,533,890; 4,829,947; and 4,779,582 disclose bistable valves in the context of variable operation of valve lifters of an automobile engine. The bistable valves employ magnetized first and second ferromagnetic cores and inner and outer axially magnetized permanent magnets. U.S. Pat. No. 4,938,545 provides a bistable valve in an anti-lock braking system.

An object of the present invention is to provide a pressure relief latching solenoid valve for maintaining fluid pressure in a preset operating range in a fluid circuit with a pressure relief function.

Still another object of the present invention is to provide a fluid circuit, such as a pressurized fuel circuit of a vehicle engine fuel control system, including the pressure relief latching solenoid valve to maintain fluid pressure in a preset operating range and accommodate fluid pressure spikes.

SUMMARY OF THE INVENTION

To this end, the present invention provides a pressure relief latching solenoid valve having an elongated armature movable along an axis and a spring residing relative to the armature in a manner to regulate fluid pressure in a preselected operating range having a maximum fluid pressure determined by a fluid control valve closed position and a preset lower fluid pressure determined by the spring rate and preload of the spring as well as seat area of the fluid control valve. The spring provides a pressure relief function to accommodate pressure spikes and other fluid pressure variations to maintain the preset lower fluid pressure in the circuit. First and second pole pieces are disposed proximate opposite axial ends of the armature, and an electromagnetic coil is provided for moving the armature between first and second positions when energized with an electrical current pulse in one direction or an opposite direction in a manner that the fluid control valve is opened or closed relative to the fluid circuit. An axially magnetized permanent magnet means is disposed proximate one pole piece and remote from the other pole piece with the axial magnetization direction of the magnet aligned in a manner to maintain the armature in either the first or second position after the electrical current pulse is terminated. The spring rate and preload of the spring as well as seat area of the fluid control valve are provided to maintain the preset fluid pressure and accommodate or relieve fluid pressure spikes in the fluid circuit to maintain the preset lower fluid pressure therein when the fluid control valve is opened relative to the fluid circuit. An axially adjustable, magnetically permeable spring compression stop is provided on the armature to adjust spring preload.

The pressure relief latching solenoid valve of the present invention is especially useful in a vehicle fuel control system, such as a pressurized fuel circuit of the vehicle fuel control system, to provide bistable on/of f states of the fuel circuit corresponding to a maximum fuel pressure (on state-valve closed) with the fluid control valve closed and a preset lower fuel pressure (off state-valve open) with a fuel pressure relief function to maintain the preset lower fuel pressure fuel pressure in the circuit. The latching solenoid valve is advantageous with respect to energy conservation since no electrical current is required to the pressure relief solenoid valve to maintain the on/off states of the fuel circuit. Power usage of the vehicle electrical system thereby is significantly reduced.

The above objects and advantages of the present invention will become more readily apparent from the following detailed description taken with the following drawings.

DESCRIPTION OF THE DRAWINGS

FIG. 3 including

DESCRIPTION OF THE INVENTION

Figure 1:
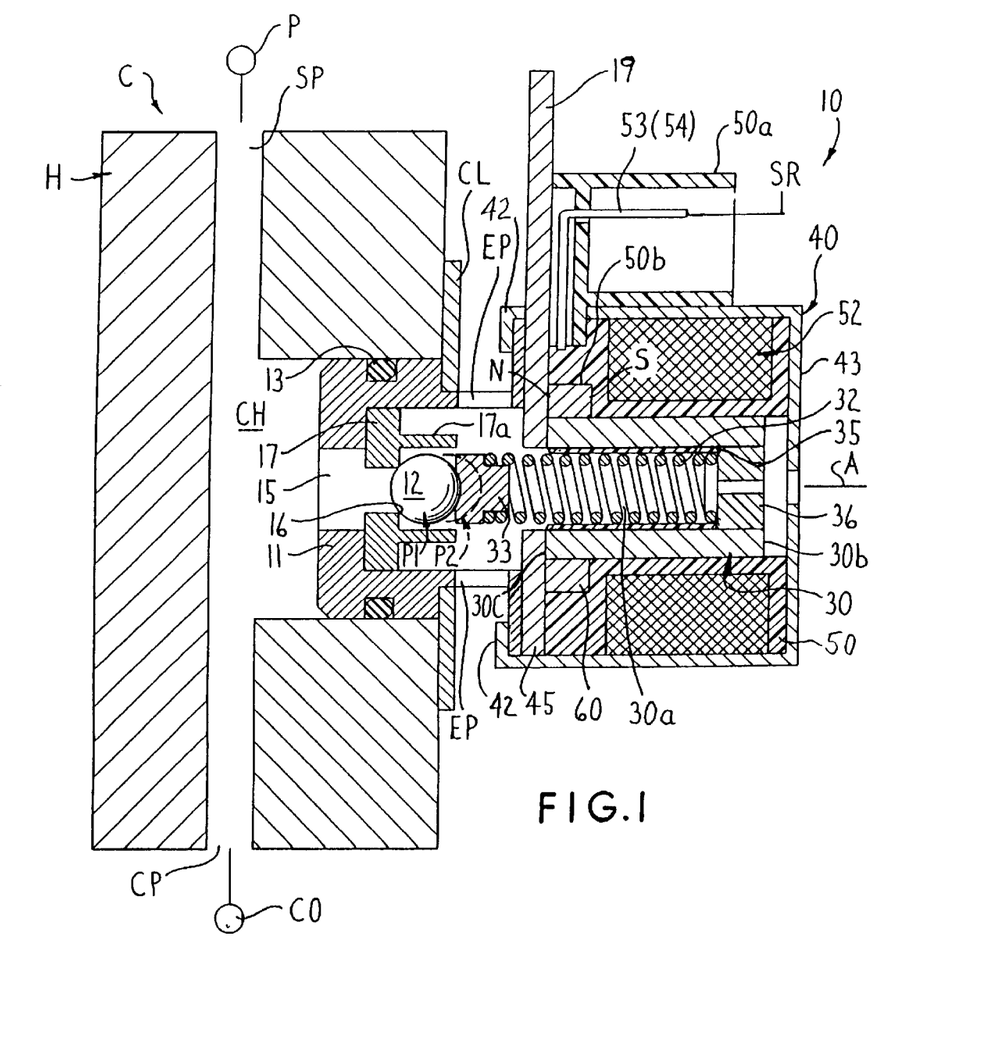
FIG. 1 is a cross-sectional view of a two way pressure relief latching solenoid control valve in accordance with one embodiment of the invention communicated to a schematically shown fluid circuit for controlling a fluid control valve between on/off positions.

Referring to FIG. 1, a pressure relief latching solenoid valve for a fluid circuit C is shown for purposes of illustration and not limitation. The pressure relief latching solenoid valve can be used with myriad types of fluid circuits that include hydraulic circuits, pneumatic circuits, fuel circuits, and others. The fluid circuit is shown schematically as including a supply port SP for supplying fluid pressure from a suitable fluid pressure source, such as a pump P, to a fluid chamber CH and a control port CP communicated to the chamber CH and to a downstream fluid pressure actuated component CO to be controlled. In FIG. 1, a pressure relief latching solenoid valve 10 in accordance with one embodiment of the invention is operable to prevent fluid from leaving chamber CH through exhaust ports EP to provide a fluid pressure "on" state of the circuit where supply pressure is present at the control port CP, or to exhaust fluid from chamber CH through exhaust ports EP to return or sump (not shown) to provide a fluid pressure "off" state of the circuit where a preselected to preset lower fluid pressure is present at the control port CP.

The pressure relief latching solenoid valve 10 includes a valve nozzle or body 11 having an outer o-ring seal 13 thereon to seal in an opening in the housing H defining chamber CH. The solenoid fluid control valve 10 is mounted by a clip CL and bracket 19 on the valve body 11 to the housing H.

The valve nozzle or body 11 includes an orifice 15 communicated to the chamber CH. A fluid filter screen (not shown) may be provided at the orifice 15. A fluid control valve member, such as ball valve 12, is disposed in the valve body 11 and is movable relative to a valve seat 16 by the solenoid valve 10 between an open position or closed position. The orifice 15 communicates to the fluid chamber CH such that opening of the ball valve 12 relative to the valve seat 16 exhausts pressurized fluid from the chamber CH through exhaust ports EP to provide the aforementioned "off" state at the control port CP and closing of the ball valve 12 on valve seat 16 prevents pressurized fluid from leaving the chamber CH to provide the aforementioned "on" state at the control port CP. The ball valve 12 moves axially in response to movement of an elongated magnetically permeable steel armature 30 of the pressure relief latching solenoid valve 10 to valve "closed" and "open" positions with respect to the circuit C that correspond to first and second positions of the armature 30. Movement of the ball valve 12 is constrained laterally of the axis A by ribs 17a formed in a castellated ball valve cage 17 disposed in the valve body 11.

In accordance with an embodiment of the invention, the armature 30 includes an interior longitudinal passage 30a having a fluid valve engaging pressure relief spring means 32 and a spring compression stop 36. The spring means 32 typically comprises a coil compression spring made of, for example only, 17-7 PH stainless steel. The spring 32 is trapped between the ball valve 12 and threaded, axially adjustable magnetically permeable (steel) stop 36 threaded into the end of passage 30a so that the armature 30 and stop 36 move together. The spring 32 preferably includes a ball valve-engaging anvil or insert 33 made of hardened tool steel for engaging the spherical ball valve 12 with point contact therebetween. The anvil or insert 33 is held on the end of the spring 32 via the necked-down region of the anvil being received in the end of the spring. The spring 32 is disposed in a non-magnetically permeable (e.g. ½ hard brass tubular bearing sleeve 35 disposed between the spring 32 and the armature 30.

The spring rate and preload of the spring 32 as well as area of valve seat 16 are selected to maintain the set fluid pressure and accommodate or relieve fluid pressure spikes in the fluid circuit to maintain the preset lower fluid pressure therein when the ball valve 12 is open relative to the fluid circuit as described below. The spring rate of spring 32 is chosen to accommodate pressure spikes and maintain the preset lower fluid pressure. The maximum fluid pressure is provided in the fluid circuit when the ball valve 12 is seated on valve seat 16 to seal or close off fluid flow to exhaust ports EP.

In the event fluid pressure in the fluid circuit C exceeds the preselected or preset lower fluid pressure when the ball valve 12 is in the open position, the spring 32 will move independently of the armature 30 in passage 30a thereof to allow the ball valve 12 to open to a further extent against the spring 32 as necessary to vent excess fluid pressure above the preset lower value from chamber CH to exhaust ports EP to maintain the circuit pressure at the preset lower value. The spring rate and preload of the spring 32 are controlled to this end, the spring rate being controlled by selection of an appropriate spring wire diameter and number of turns of the spring. The spring preload is controlled by axial adjustment of the threaded spring compression stop 36 in the armature 30 so as to axially bias or load the spring 32 toward the ball valve 12 to an initial preload level when the ball valve 12 is in its open position.

For example only, in an application to control fuel pressure in a fuel control system of a vehicle, a coil spring 32 made of 17-7PH stainless steel having a spring rate of 10 pounds/inch is preloaded to 0.285 pounds with the ball valve 12 in the open position by axial adjustment of spring compression stop 36 to cause circuit fuel pressure to drop from a maximum 85 psi value when the ball valve 12 is closed on seat 16 to a preset lower 43 psi value when the ball valve is in the open position and remain at the 43 psi value despite the occurrence of fuel pressure spikes in the fuel circuit. In effect, the pressure spikes are accommodated by the spring 32. When the ball valve is in its closed position on seat 16 by virtue of movement of the armature 30 to the position shown in FIG. 1 proximate pole piece 45, the spring 32 and armature 30 are designed to provide a bias sufficient to maintain the maximum 85 psi pressure value.

The elongated steel armature 30 is movable along an axis A between first and second positions P1, P2, (position P1 being shown in solid lines and position P2 being shown in dashed lines in FIG. 1). In position P1, the armature 30 moves to the left position in FIG. 1 to move the ball valve 12 to engage valve seat 16 to close the orifice 15. In position P2, the armature 30 is moved to the right position to allow the ball valve 12 to open relative to orifice 15 under action of the supply pressure in chamber CH.

An end wall 43 of a steel solenoid housing 40 defines a first magnetically permeable pole piece disposed adjacent or proximate the axial end 30b of the armature 30. A second pole piece is adjacent or proximate the other opposite axial end 30c of the armature 30 and is formed by a magnetically permeable annular steel disc or plate 45 which may be part of bracket 19. The steel housing 40 thereby provides a flux path between the pole pieces 43, 45 of the solenoid.

The steel solenoid housing 40 includes a plurality of crimped over regions 42 crimped onto the valve body 11 to join the valve body 11, a molded plastic coil bobbin 50, pole piece plate 45 and the steel solenoid housing 40 as an assembly.

The plastic coil bobbin 50 disposed in the solenoid housing 40 with one end wall abutted against the end wall pole piece 43 and the other end wall abutted against the pole plate 45. The bobbin 50 includes a wire coil 52 wound thereon and connected to a pair of side-by-side metal electrical terminal strips 53, 54 embedded in the bobbin 50 proximate the coil and extending through a terminal cap 50a molded on the bobbin 50 for connection to appropriate connectors (not shown) of an electrical current pulse source SR that can include, but is not limited to, a power supply or motor vehicle fuel system control module, that can provide periodic electrical current pulses to the coil 52 in opposite current flow directions during operation of the fluid circuit C.

The electrical current pulses are supplied to the wire coil 52 in one direction to move the armature 30 to position P1 and in the opposite direction to move the armature to position P2. The electrical pulses are provided by an electronic driver illustrated in FIGS. 2 and 3 and described herebelow. In either of the operative armature positions P1 or P2, the armature 30 will be spaced from one pole piece 43, 45 farther than it is from the other pole piece. As a result, when the coil 52 is energized with an appropriate electrical current pulse, the armature 30 will move from the one position P1 (or P2) to the other position P2 (or P1) to reduce the air gap. The pole piece to which the armature 30 moves in response to the current pulse provides an armature travel stop that limits additional armature movement. For example, in FIG. 1, pole plate 45 contacts armature end 30c at position P1 to limit additional travel of the armature 30 in that direction. Pole piece 43 similarly acts as an armature travel stop to limit armature movement in that direction.

A single axially magnetized, tubular permanent magnet 60 is disposed in an axial pocket 50b of the bobbin 50 proximate pole plate 45 about axial armature end 30c and remote and spaced from the other pole piece. The axial magnetization direction of the magnet (direction between the north pole N and south pole S) of the permanent magnet 60 is aligned generally parallel with the axis A of armature movement to maintain the armature 30 in either the position P1 or P2 after the electrical current pulse is terminated to the coil 52. The permanent magnet 60, in effect, provides permanent magnetic flux through the flux path described above to hold the armature in either position P1 or P2 after the electrical current pulse is terminated to the coil 52, thereby providing bistable first and second armature positions that can be maintained without energization of the solenoid coil 52. The armature positions P1 or P2 can be changed from one position P1 (or P2) to the other position P2 (or P1) simply by supplying by an appropriate electrical current pulse in the opposite direction to the solenoid coil 52. The axially magnetized permanent magnet 60 will hold the armature 30 in the new position P1 or P2 by virtue of the permanent magnetic flux passing through the flux path formed by steel housing 40 and pole pieces 43, 45.

The tubular permanent magnet means 60 can comprise a one piece annular magnet as shown or, alternately, can comprise a plurality of permanent magnet arcuate segments circumferentially spaced apart and arranged about the armature in respective axially extending arcuate pockets, similar to pocket 50b, of the bobbin proximate pole piece 45 and about the end 30c of the armature so as to collectively function as permanent magnet means 60. For example, two arcuate permanent magnet segments can be circumferentially spaced apart in respective axially extending arcuate pockets of the bobbin proximate the pole piece 45 and about the end 30c of the armature as described in copending application Ser. No. 09/063,963 of common assignee herewith, the teachings of which are incorporated herein by reference. The permanent magnet means 60 can comprise a samarium-cobalt, preferably a rare earth-iron-boron (e.g. $Nd_2Fe_{14}B$), or other suitable axially magnetized permanent magnet having a north pole N and south pole S for positioning as shown in FIG. 1. Such permanent magnets are available commercially from Hitachi Metals Corporation.

As mentioned hereabove, the pressure relief latching solenoid valve 10 of the present invention is especially useful in a vehicle fuel control system, such as for controlling a pressurized fuel circuit to provide a maximum fuel pressure and a preset lower fuel pressure with effective pressure relief function to maintain the preset fuel pressure against fuel pressure spikes. The present invention is especially advantageous in use in a vehicle fuel control circuit to provide significant energy conservation since no electrical current is required to the solenoid coil to maintain either the "on" or the "off" states or positions with the aforementioned pressure relief function. Power usage of the vehicle electrical system thereby is significantly reduced during vehicle operation. Power usage of the vehicle electrical system also can be significantly reduced when the vehicle is inactive (e.g. vehicle is parked) since the controlled fuel system component can be maintained in a predetermined state by the bistable positions of the solenoid armature 30 and thus the ball valve 12.

Figure 2:
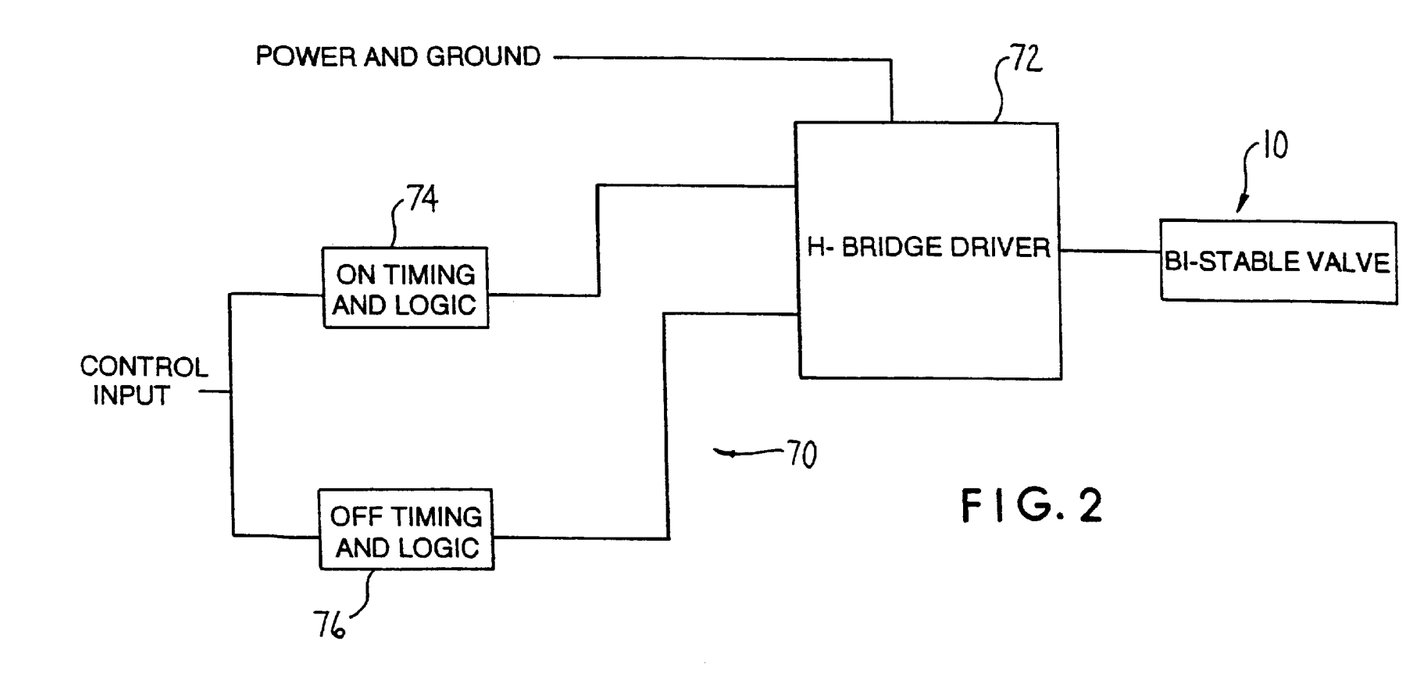
FIG. 2 is a schematic diagram of an electronic driver for controlling the pressure relief solenoid valve.

Referring to FIG. 2, an electronic driver 70 for controlling the pressure relief solenoid valve described above to control a pressurized fuel circuit of a motor vehicle is illustrated. For example, the driver 70 comprises an H-bridge 72 and "on" timing and "off" timing logic circuits 74, 76, which are controlled by the ignition circuit of a vehicle. The "on" timing corresponds to the ball valve 12 being in its open bistable position relative to valve seat 16 with pressure relief provided by spring 32, while the "off" timing corresponds to the ball valve 12 being in its closed bistable position sealing off the valve seat 16. In particular, when the control signal from the ignition circuit goes high (e.g. 12 V), the "on" timing circuit 74 drives the H-bridge section 72 on or active to provide an output polarity. The "on" duration is set as required by the valve performance requirements for a particular fuel control system. The timing logic also locks out the other off timing driver 76 so as to prevent short circuits through the H-bridge.

When the control signal from the ignition circuit goes low (e.g. 0 V), the "off" timing circuit 76 drives the H-bridge section 72 on or active to provide an output polarity of opposite sign to the previous output polarity. The "off" duration is set as required by the valve performance requirements for the particular fuel control system. The timing logic also locks out the other driver 74 so as to prevent short circuits through the H-bridge. When the "off" timing is complete, the current draw of the pressure relief solenoid valve drops to a very low value, thus reducing battery drain.

The H-bridge section 72 performs the output polarity switching for bi-directional control of the pressure relief solenoid valve and thus the fluid circuit C and fluid component connected thereto. The H-bridge comprises four switches (transistors) Q1, Q2, Q3, Q4 with two switches connected to a vehicle or other battery and two switches connected to "ground" in an H pattern shown in FIG. 3. The wire coil 52 of the pressure relief solenoid valve is connected across the center portion of the H-bridge section 72, see FIG. 3. By turning on the upper left and lower right switches Q1, Q4, a polarity is applied across the solenoid wire coil 52 in one direction. If the upper right and lower left switches Q2, Q3 are turned on, the opposite polarity is applied to the wire coil 52. A short circuit can be generated by turning both the upper and lower switches on the same side of the H-bridge section together. Logic circuits are provided for each side of the H-bridge section to prevent this short circuit situation from occurring.

Figure 3:
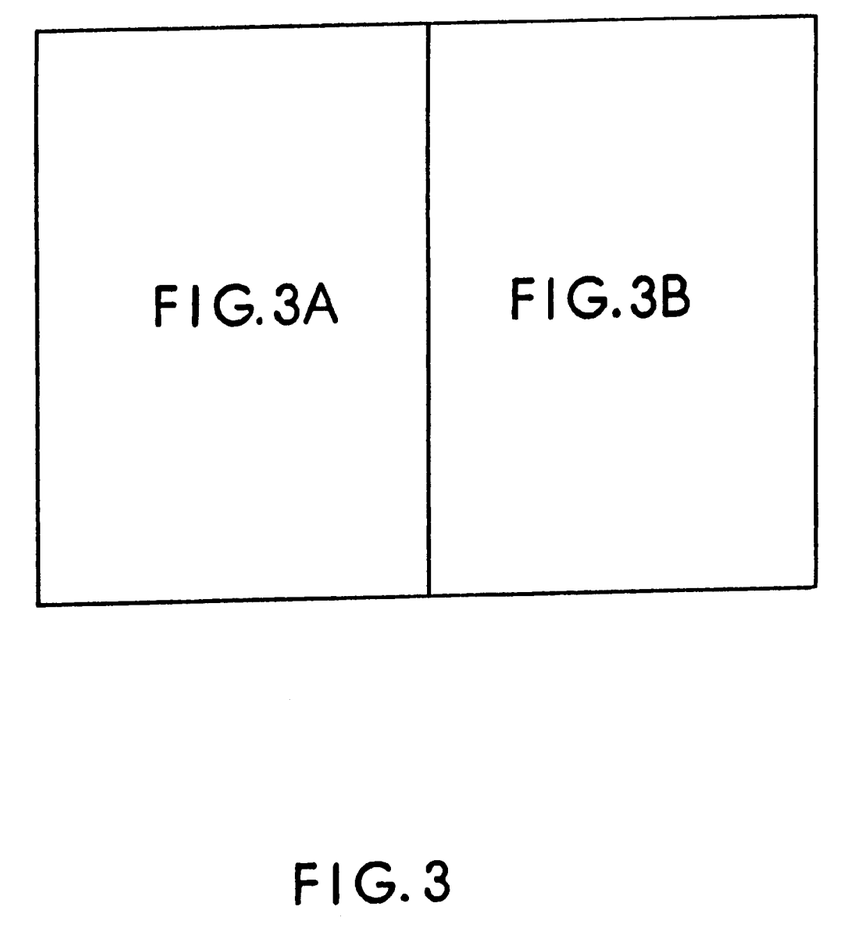

Referring to FIG. 3, control input to the valve driver 70 is the ignition circuit of the vehicle. The vehicle circuit has a relatively low impedance to ground. When this signal goes HIGH (e.g. +12V), the circuit section 74 shown in FIG. 2 is activated and produces a short pulse of electrical current to the solenoid valve 10, changing the valve 10 to the activated or "ON" state. The solenoid valve 10 latches in this position until the control input signal goes LOW (e.g. GND or ground). Section 76 of FIG. 2 is now activated and a short pulse of current is applied to the valve 10; only this time, it is the reverse polarity and turns the valve 10 to the "OFF" state. Once again, the permanent magnet of the valve 10 maintains this position.

The section 72 of FIG. 2 includes the output power transistors Q1–Q4. These transistors form the solid state power switches that actually drive the valve 10. A problem with the H-bridge circuit is the short or cross-conduction of the output transistors. This problem is addressed by use of the single pre-driver transistor Q5 or Q6 for each of the two control conditions. In addition, the use of cross-protection clamp transistors Q7, Q8 and the pre-driver transistors eliminates the shorting condition, thus protecting the circuit form failure due to overcurrent burnout.

In FIG. 3, the +12 volt battery power is constant at terminal #5. Ground (or chassis) is constant at terminal #1 of control module. Valve negative terminal is connected to module terminal #2, while valve positive terminal is connected to terminal #4. Input signal is connected to terminal #3.

The power supply includes resistor R20 and capacitors C6 and C7 that are supply filters for the logic circuits. Diode D8 is a reverse blocking diode to protect the circuit. Zener diode D7 is voltage regulator for the logic circuits which require constant voltage to operate properly. Thermal Fuse is a self-resetting thermal current limiter for overcurrent protection.

The "on" timing logic circuit section 74 comprises a resistor RI, capacitor C1, and diodes D1, D2 used for input protection and noise filtering, reducing false triggering of the circuits. Capacitor C2, resistors R3 and R21 comprise the "On" timing function. When the Control Input goes HIGH (ON), capacitor C1 which is discharged, turns "ON" transistor Q10 through resistor R21. This pulse lasts only as long as the RC time constant of capacitor C2, resistor R3, resistor R21 and the base current of transistor Q10 allows. Transistor Q10 turns on the inverter transistor Q11, producing a positive "ON" pulse at terminal TP-1. Diode D3 and resistor R2 provide a rapid discharge of capacitor C2 through resistor R1 and the "Control Input" circuit of the vehicle. Resistor R22 is a base resistor for transistor Q11. Resistor R23 is a load resistor for transistor Q11 and will produce the "OFF" value when required for the signal at terminal TP-1. This pulse generation occurs only upon the "OFF" to "ON" transition of the "Control Input" signal.

The "off" timing logic circuit section 76 comprises a capacitor C3 and resistors R5 and R6 that comprise the "off" timing function. When the "Control Input" goes LOW (OFF), capacitor C3, which is discharged, turns on transistor Q9 through resistor R6. This pulse last only as long as the RC time constant of capacitor C3 and resistors R5 and R6 and the base current of transistor Q9 allows. Transistor Q9 produces a positive "ON" pulse at terminal TP-2. Resistor R7 is a load resistor for transistor Q9 and will produce the "OFF" value when required for the signal at TP-2. This pulse generation occurs only upon the "ON" to "OFF" transition of the "Control Input" signal.

The H-bridge solenoid driver section 72 is comprised of transistors Q1, Q2, Q3, Q4. Transistors Q5 and Q6 are the directional controllers. Transistors Q7 and Q8 are the cross protection clamps. Tranzorb TZ dual direction diode provides protection in both directions and absorbs the inductive spike generated by the valve coil, thus protecting the circuit from false triggering.

Resistors R8 and R11 are base driver limiters for the output transistors Q1, Q2. Resistors R9, R10, R13, R14, R12, R15 are base stabilization resistors. Resistors R16, R18, R17, and R19 are base drive limiter resistors for the control transistors.

When an "ON" signal is present at TP-1, transistor Q5 is turned "ON". This turns bridge transistors Q2 and Q3 "ON". The combination of transistors Q2 and Q3 presents a voltage polarity of "positive" at terminal 4, and a negative polarity at terminal 2. The "ON" signal at TP-1 also turns on the cross-protection clamp transistor Q7, thus preventing transistors Q6, Q1, and Q4 from turning on causing a short circuit from terminal 5 (battery) to terminal 1 (ground).

When the "ON" signal at TP-1 returns to "OFF", all transistors are turned "OFF", and the voltage across terminals 2 and 4 goes to zero. Both cross-protection clamps are turned off, enabling either TP-1 or TP-2 to become active.

When an "ON" signal is present at TP-2, transistor Q6 is turned "ON". This turns bridge transistors Q1 and Q4 "ON". The combination of transistors Q1 and Q4 presents a voltage polarity of "positive" at terminal 2, and a negative polarity at terminal 4. The "ON" signal at TP-2 also turns on the cross-protection clamp transistor Q8, thus preventing transistors Q5, Q2, and Q3 from turning on causing a short circuit from terminal 5 (battery) to terminal 1 (ground).

When the "ON" signal at TP-2 returns to "OFF", all transistors are turned "OFF", and the voltage across terminals 2 and 4 goes to zero. Both cross-protection clamps are turned off, enabling either TP-1 or TP-2 to become active.

Figure 3A:
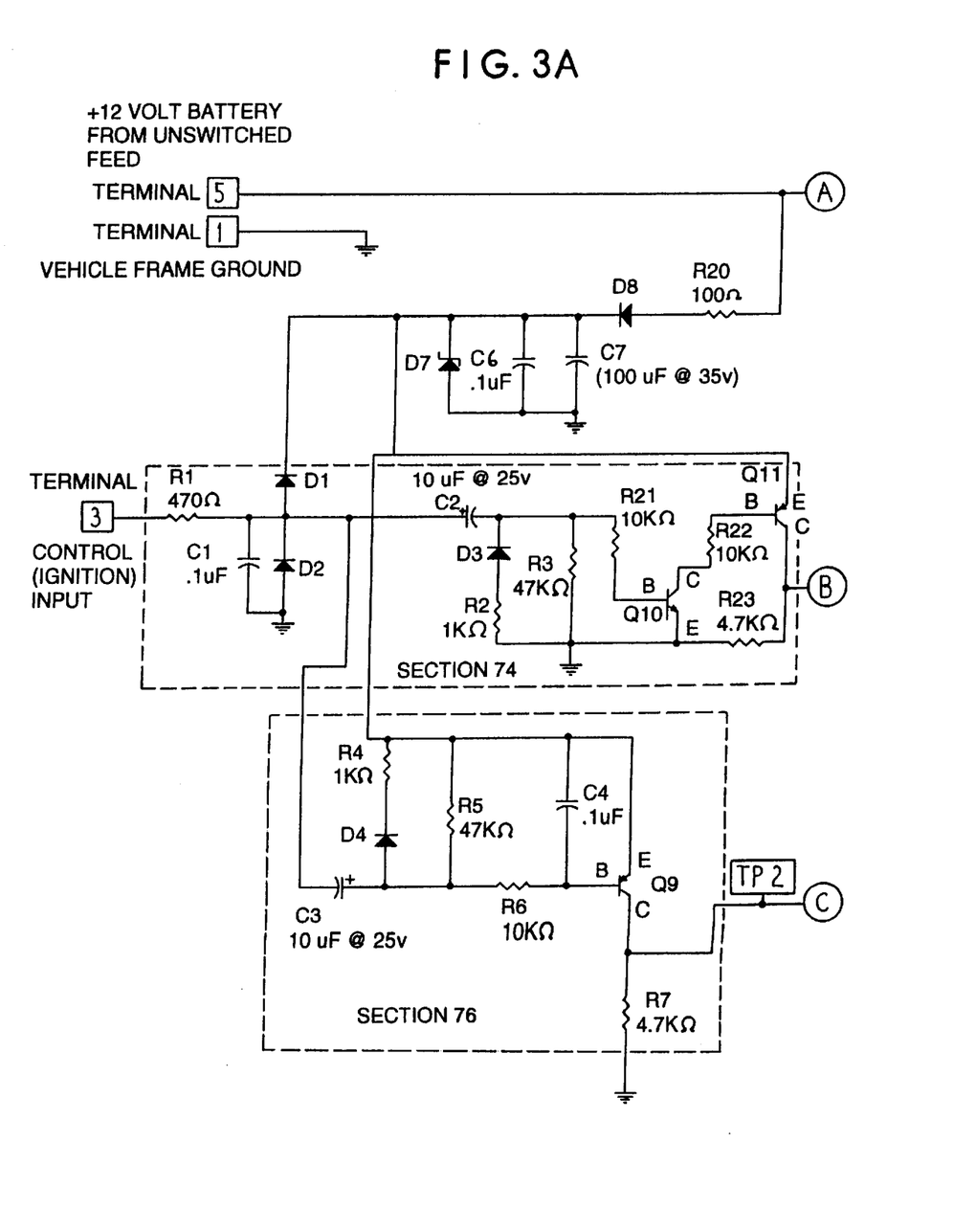
FIGS. 3A, 3B is a schematic electrical diagram of the driver components for controlling the valve.
Figure 3B:
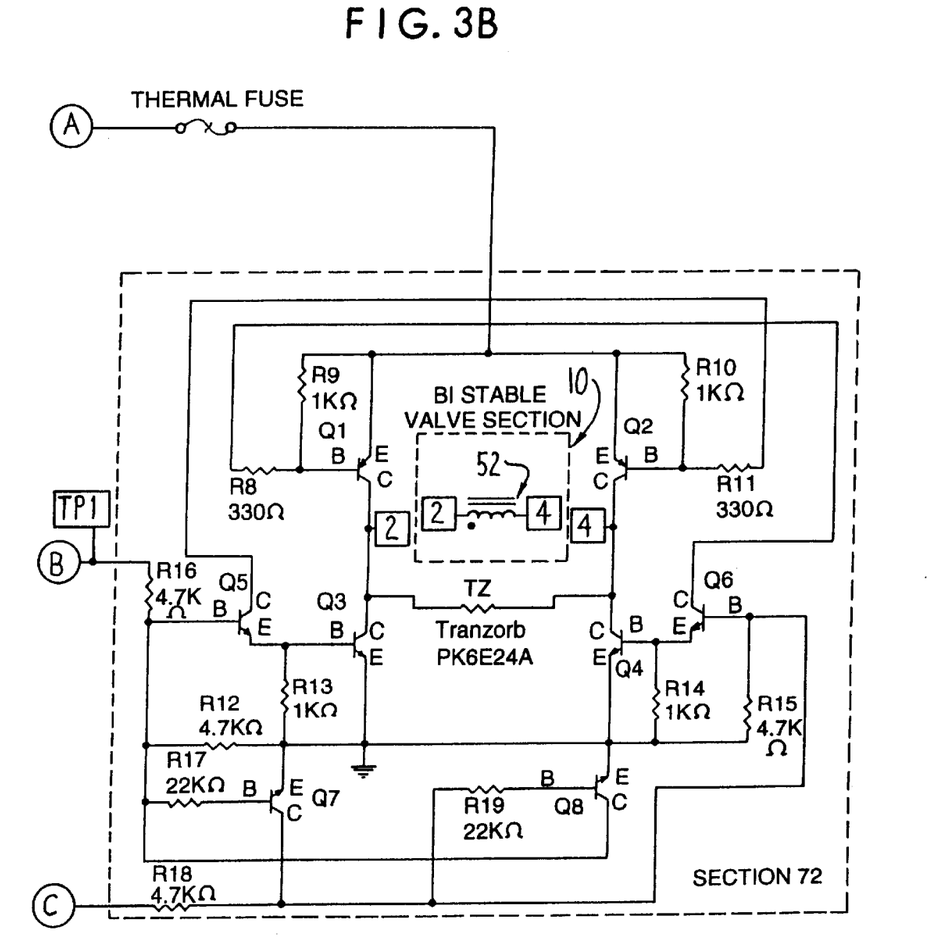

In FIGS. 3A, 3B, the values of the various resistors in ohms are set forth below or adjacent each resistor. For the transistors, B is base, E is emitter, and C is collector.

Although certain illustrative embodiments of the invention have been described and shown in detail, those skilled in the art will appreciate that the invention is not limited to these embodiments and that changes, modifications and the like can be made thereto within the scope of the invention as set forth in the appended claims.

We claim:

1. Pressure relief solenoid valve for a fluid circuit, comprising an armature movable along an axis between first and second armature positions to control a fluid control valve member between respective valve open and valve closed positions relative to a valve seat communicating the fluid control valve member to the fluid circuit, first and second pole pieces disposed proximate opposite axial ends of the armature, an electromagnetic coil for moving the armature between the first and second armature positions when energized with an electrical current pulse in one direction or an opposite direction, axially magnetized permanent magnet means disposed proximate one of said first and second pole pieces and remote and spaced from the other of said first and second pole pieces with an axial magnetization direction of the magnet means aligned in a manner to maintain the armature in one of the first and second armature positions after the electrical current pulse is terminated so as to provide bistable first and second armature positions that can be maintained without solenoid energization and that can be changed from one of said first and second armature positions to the other of said first and second armature positions by an electrical current pulse to the electromagnetic coil, and spring means disposed between the armature and the fluid control valve member, said spring means having a spring rate and spring preload and said valve seat having a surface area selected to maintain a preset fluid pressure in the fluid circuit with a pressure relief function when the fluid control valve member is in its valve open position relative to the valve seat.

2. The valve of claim 1 wherein said spring means is disposed in a longitudinal passage of the armature and preloaded by the position of a stop in the passage.

3. The valve of claim 2 wherein the spring means comprises a coil spring having one end with an anvil to engage the fluid control valve member and the other end engaged with the stop.

4. The valve of claim 1 wherein the axial magnetization direction of said magnet is aligned generally parallel with the axis of movement of said armature.

5. The valve of claim 1 wherein said axially magnetized permanent magnet comprises a tubular permanent magnet disposed about an end of said armature.

6. The valve of claim 1 wherein said first and second pole pieces are disposed proximate enough to the axial ends of said armature that the first pole piece provides an armature stop at the first armature position and the second pole piece provides an armature stop at the second armature position.

7. The valve of claim 1 in combination with a polarity reversing H-bridge to change polarity of electrical current to the solenoid coil from one direction to the opposite direction.

8. A pressurized fluid circuit including the pressure relief solenoid valve of any one of claims 1–6.

9. The circuit of claim 8 wherein said pressure relief solenoid valve provides a maximum fluid pressure when the fluid control valve is closed on the valve member seat and a preset lower fluid pressure when the fluid control valve member is open relative to the valve seat, said spring being moveable relative to the armature to provide a pressure relief function when the fluid control valve member is open.

* * * * *

UNITED STATES PATENT AND TRADEMARK OFFICE
CERTIFICATE OF CORRECTION

PATENT NO    : 6 164 322
DATED        : December 26, 2000
INVENTOR(S)  : Hamid Najmolhoda, et al.

It is certified that error appears in the above-identified patent and that said Letters Patent are hereby corrected as shown below:

Correct [73] Assignee to:   ---Saturn Electronics & Engineering, Inc.

Column 9, line 5; after "valve" (first occurrence) insert ---member---.

Column 10, line 1; after "valve" insert ---member---.

Signed and Sealed this

First Day of May, 2001

*Attest:*

NICHOLAS P. GODICI

*Attesting Officer*     Acting Director of the United States Patent and Trademark Office